United States Patent [19]

Meister

[11] Patent Number: 4,511,028

[45] Date of Patent: Apr. 16, 1985

[54] GANG CONVEYOR DRIVE MOUNT AND METHOD FOR TRANSPORTING

[75] Inventor: Richard P. Meister, Newton, Kans.

[73] Assignee: Bunting Magnetics Company, Newton, Kans.

[21] Appl. No.: 481,588

[22] Filed: Apr. 4, 1983

[51] Int. Cl.³ ............................................. B65G 21/00
[52] U.S. Cl. ................................... 198/497; 198/570; 198/816; 198/817
[58] Field of Search ............... 198/570, 817, 497, 816

[56] References Cited

U.S. PATENT DOCUMENTS

| | | | |
|---|---|---|---|
| 1,050,400 | 1/1913 | Steele | 198/817 |
| 2,973,084 | 2/1961 | Sinden et al. | 198/816 |
| 3,923,148 | 12/1975 | Dorner | 198/570 |

*Primary Examiner*—Jeffrey V. Nase
*Attorney, Agent, or Firm*—John H. Widdowson

[57] ABSTRACT

A gang conveyor drive mount for a frame base comprising in combination a pair of rails secureable to the frame base, and a motor gear box assembly attached to the rails. A drive shaft engages the gear box which is mechanically connected to the motor. At least one conveyor is slidably mounted along the drive shaft and rails and extends over the frame base such that the results of work fall on the conveyor in order to be carried away to a storage or use area. At least one bracket is slidably mounted along the pair of rails, and at least one bearing is fixed to the bracket and slidably mounted along the drive shaft. The conveyor and the combined bracket-bearing are adapted in operation of the invention to be slidably adjusted along the drive shaft and the rails in order that the gang conveyor drive mount can be mounted on any given frame base. A method for transporting the results of work comprises engaging the drive shaft to a motor gear box assembly, and securing the motor gear box assembly to the rails. The method also includes sliding along the drive shaft and the rails at least one conveyor until the same extends over a predetermined area of a given size frame base such that the results of work fall on the conveyor.

9 Claims, 8 Drawing Figures

GANG CONVEYOR DRIVE MOUNT AND METHOD FOR TRANSPORTING

BACKGROUND OF THE INVENTION

1. Field of the Invention

This invention provides a gang conveyor drive mount. More specifically, this invention contemplates a novel gang conveyor drive mount and a method for transporting the results of work, or the like, which is adapted to be used with any given size frame base having rails secured thereto in order to slidably mount the gang conveyor drive mount to the rails.

2. Description of the Prior Art

U.S. Pat. No. 273,504 by Titus, et al discloses a manner of adjusting an idler roll to effect tensioning of the belt. U.S. Pat. No. 2,787,367 by Been also illustrates an idler roll which can also be adjusted to effect tensioning of the belt. U.S. Pat. No. 2,168,622 by Levin and U.S. Pat. No. 2,317,235 by Lemmon illustrate the manner in which a conveyor belt is tensioned. U.S. Pat. No. 4,013,166 by Weady et al illustrates the manner of mounting a roller on a spindle. U.S. Pat. No. 1,620,168 by Silver and U.S. Pat. No. 4,230,222 by Clark disclose a spindle mount. None of the foregoing prior art teach or suggest the particular gang conveyor drive mount and method for transporting of this invention.

SUMMARY OF THE INVENTION

This invention accomplishes its desired objects by providing a novel gang conveyor drive mount means which comprises in combination a frame base, a rail means secured to the frame base, and a motor-gear box means attached to the rail means. A drive shaft means engages the motor-gear box means. At least one conveyor means slidably mounts along the drive shaft means and the rail means and extends over the frame base such that the results of work falls on the conveyor means in order to be carried away to a storage or use area. At least one bracket means is slidably mounted along the rail means, and at least one bearing means is fixed to the bracket means and slidably mounted along the drive shaft means. The conveyor means and the combined bracket bearing means are adapted in operation of the invention to be slidably adjusted along the drive shaft means and the rail means in order that the gang conveyor drive mount means can be mounted on any given frame base having the attached rail means. A method for transporting the results of work, or the like, from the given size frame base having the rail means to a storage or use area comprises the steps of engaging a drive shaft means to a motor-gear box means and securing the motor-gear box means to the rail means. The method additionally comprises sliding along the drive shaft and the rail means at least one conveyor means until the same extends over a predetermined area of the given size frame base such that the results of work fall on the conveyor means.

It is an object of the invention to provide a novel gang conveyor drive mount means which is capable of being mounted on any given frame base.

Still further objects of the invention reside in the provision of a gang conveyor drive mount means and a method for transporting the results of work from any given size frame base having rails to a storage or use area.

These together with the various ancillary objects and features will become apparent as the following description proceeds, are attained by this invention, preferred embodiments being shown in the accompanying drawings, by way of example only, wherein:

DETAILED DESCRIPTION OF THE INVENTION

Figure 1:
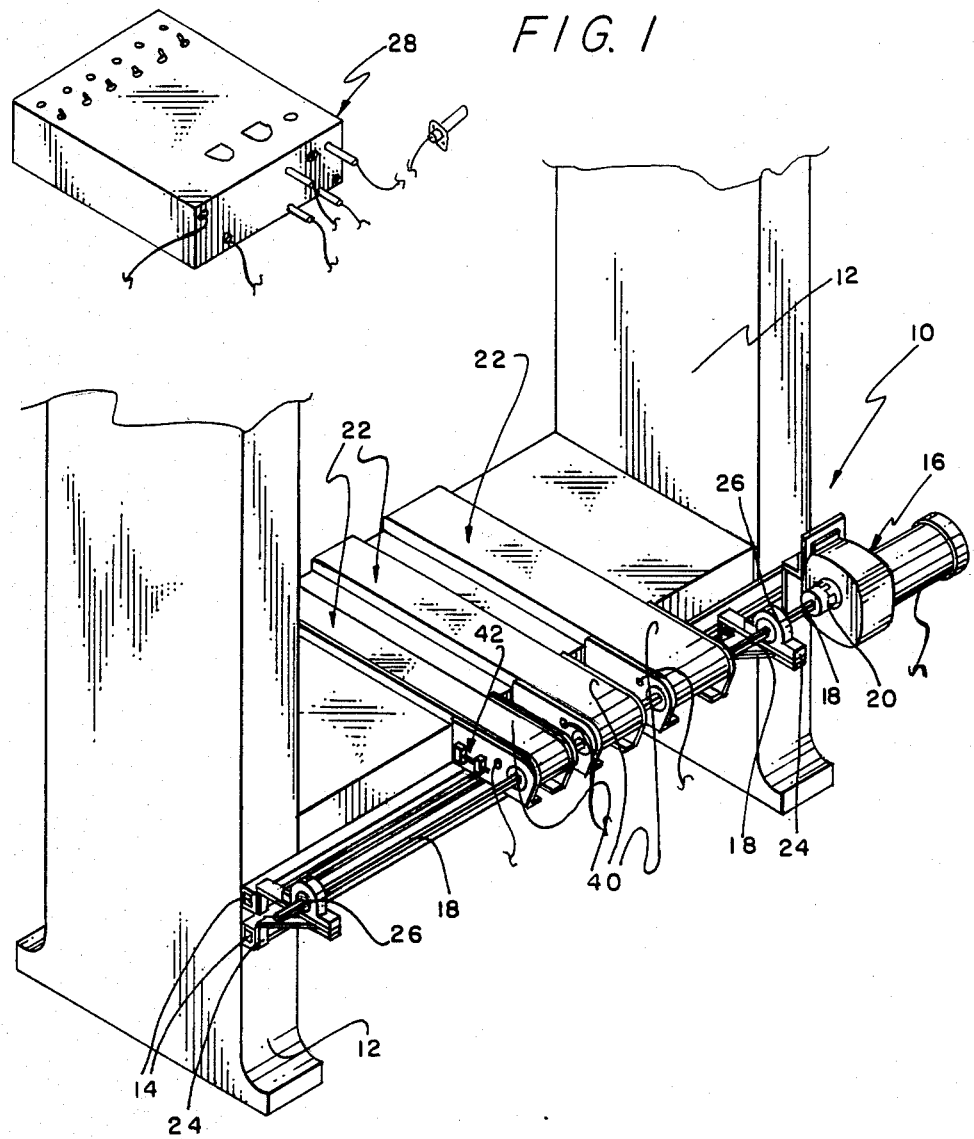
FIG. 1 is a perspective view of the gang conveyor drive mount of this invention along with the electronic control for the same.

Referring in detail now to the invention wherein similar parts of the invention are identified by like reference numerals, there is seen the gang conveyor drive mount, generally illustrated as 10, having in combination a frame base 12, a pair of generally hollow conduit rails 14—14 secured to the frame base 12, and a motor-gear box, generally illustrated as 16, attached to the rails 14—14. The motor-gear box 16 has a gear shaft (not shown in the drawings) extending therefrom and connected to a drive shaft 18 via a flexible coupling 20. The frame base 12 is usually that of a punch press or the frame base of a specialized machine.

Figure 2:
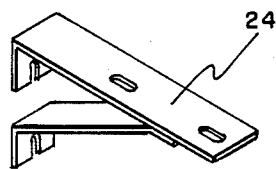
FIG. 2 is a perspective view of a bracket which mounts a bearing that is slidable along the drive shaft that engages the motor-gear box of the drive mount.
Figure 3:
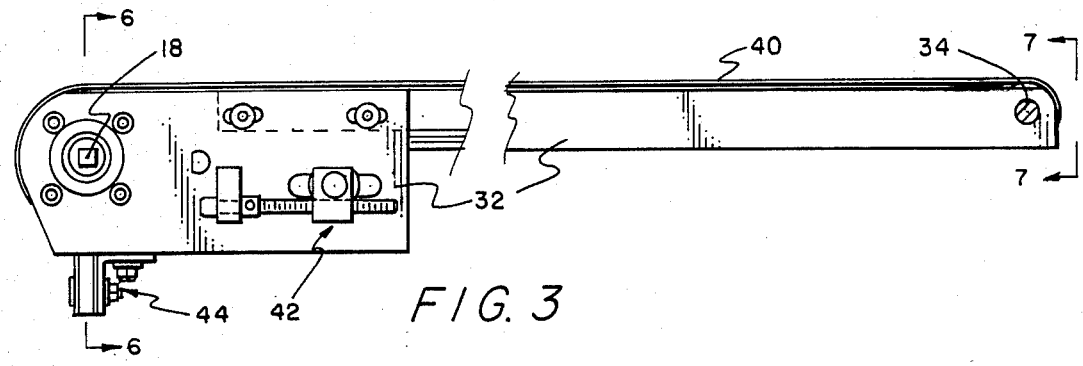
FIG. 3 is a partial side elevational view of a conveyor.
Figure 4:
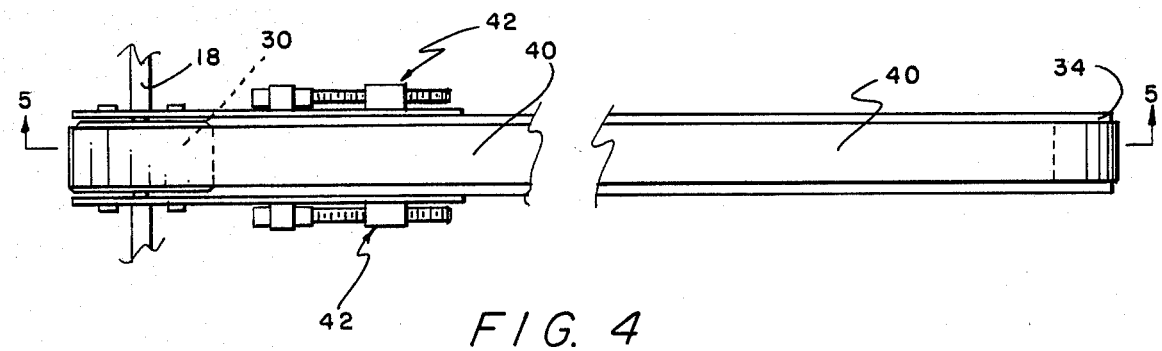
FIG. 4 is a partial top plan view of a conveyor.

The gang conveyor drive mount 10 of this invention additionally has at least one conveyor means, generally illustrated as 22, slidably mounted along the drive shaft 18 and the rails 14—14 and extends over the frame base 12 such that the results of work from above fall on the conveyor means 22 in order to be transported to a storage or use area. Bearing brackets 24—24 (see FIG. 2) slidably mount along the rails 14—14. Each bracket 24 has a shaft bearing 26 fixed thereto. Shaft bearings 26—26 are slidable along the drive shaft 18. The conveyor means 22 is disposed along the drive shaft 18 between the shaft bearings 26—26 such that in operation of the invention the pair of combined bracket 24-shaft bearing 26 and the conveyor means 22 are adapted to be slidably adjusted along the drive shaft 18 and rails 14—14 in order that the gang conveyor drive mount 10 of this invention can be mounted on any given size frame base 12. The bearings 26 and brackets 24 shown and described are preferable, however, as will be appreciated, the installation can be effective without the bearing 26 furthest from the motor.

The gang conveyor drive mount 10 additionally comprises a control means, generally illustrated as 28 in FIG. 1, for turning on and off the conveyor means 22 and the motor-gear box 16 through electrically engaging the same. Electronic control means 28 also preferably provides a signal to turn the press on or off for constant protection from jam damage and damage to the press and tooling. In the event of a jam of a conveyor means 22 electronic control means 28 will disconnect power to the motor-gear box 16, indicate a malfunction warning, and stop any punch pressing being mechanically performed, if desired.

Figure 5:
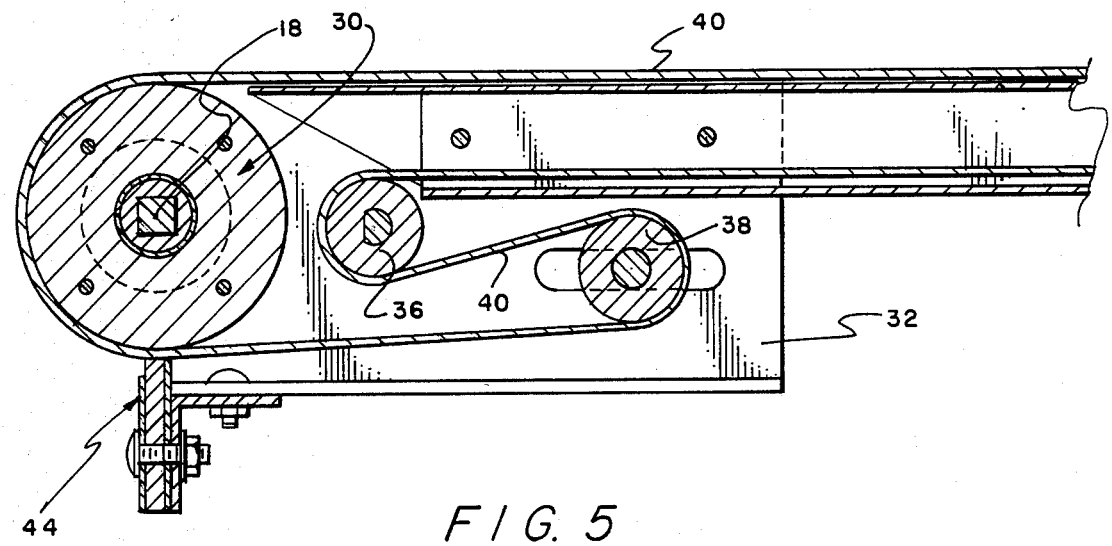
FIG. 5 is a partial vertical sectional view taken in direction of the arrows and along the plane of line 5—5 in FIG. 4.
Figure 6:
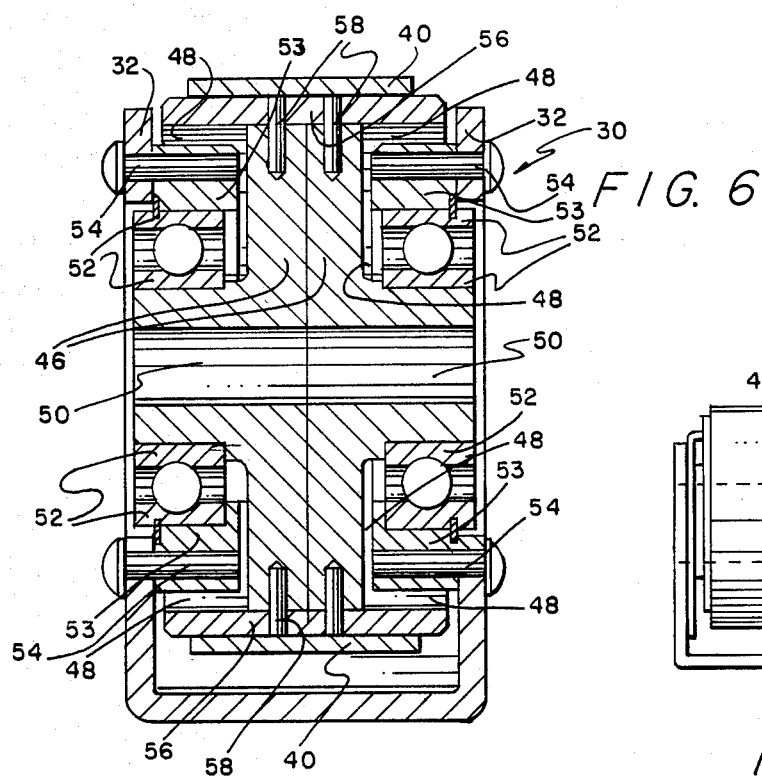
FIG. 6 is an enlarged vertical sectional view taken in direction of the arrows and along the plane of line 6—6 in FIG. 3.
Figure 7:
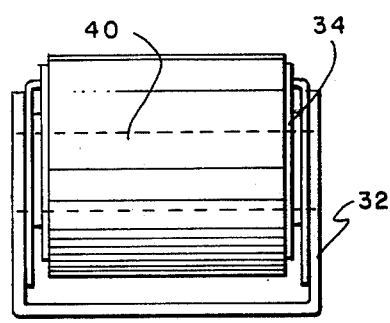
FIG. 7 is an enlarged side elevational view taken in direction of the arrows and along the plane of line 7—7 in FIG. 3.
Figure 8:
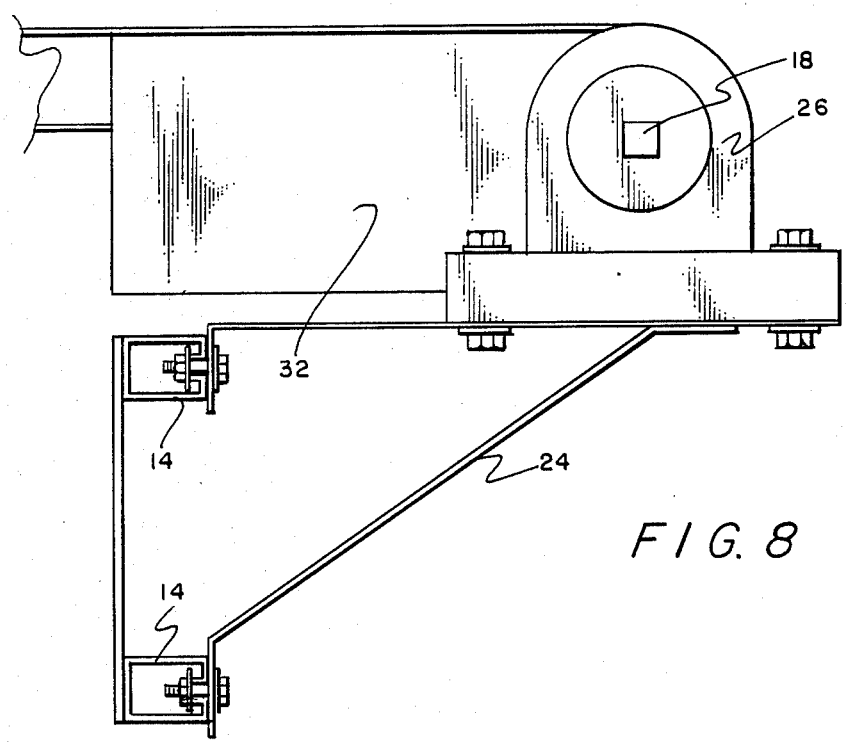
FIG. 8 is an enlarged partial side elevational view of a conveyor along with a bracket having a bearing fixed thereto which is slidably mounted to a drive shaft.

The conveyor means 22, in a preferred embodiment of the invention, comprises a drive spindle, generally illustrated as 30, (see FIG. 5), which is slidably mounted along the drive shaft 18 between shaft bearing 26—26, and rotatable with the drive shaft 18 at one end of a conveyor housing 32. A tail roller 34 is rotatably disposed at the other end of the conveyor housing 32. An idler roller 36 and a take-up roller 38 are also rotatably positioned in the conveyor housing 32 in proximity to the drive spindle 30 (see FIG. 5). An endless conveyor belt 40 engages the drive spindle 30, the tail roller 34, the idler 36 and take-up roller 38 to form a loop. Take-up means, generally illustrated as 42, is connected to the conveyor housing 32 and to the shaft of the take-up roller 38 in order to tighten or loosen the endless belt 40 by moving the take-up roller 38 relative to the idler roller 36. A belt wiper means, generally illustrated as 44, attaches to the conveyor housing 32 underneath the drive spindle 30 to wipe and clean the endless belt 40 as it passes over the drive spindle 30.

In a preferred embodiment of the invention, the drive spindle 30 includes a pair of circular flanged pieces 46—46 which when combined has a structure defining a pair of opposed external recesses 48—48 and a drive shaft bore 50 wherethrough the drive shaft 18 passes to offer rotational power to the flanged mated pieces 46—46. Bearing 52 and stationary circular pieces 53—53 lodge in recesses 48—48. Stationary pièces 53—53 attach to the end of conveyor housing 32 by bolts 54. The side frame 32 is "L" shaped and touches in narrow width conveyor means 22 as illustrated. Wiper means 44 is preferably mounted onto the flanges by bolts. See FIG. 5. A spindle sleeve 56 circumscribes the pair of mated flanged pieces 46—46 and is secured to each piece 46 by shafts 58—58 in order to hold the pieces 46—46 together and to provide a surface for the endless belt 40 to engage the same to be turned by the combined spindle sleeve 56- mated pieces 46—46 which receive rotational power from the drive shaft 18.

With continuing reference to the drawings for operation of the invention and the method for transporting the results of work falling from above a given size frame base 12, having rails 14—14 secured thereto, the motor-gear box 16 is connected to the rails 14—14 or the frame base 12. The drive shaft 18 is secured to the gear shaft of the motor-gear box 16 preferably through a flexible coupling 20. Subsequently, in a preferred embodiment of the invention, a bearing bracket 24 with shaft bearing 26 fixed thereto is mounted by simultaneously sliding the shaft bearing 26 along the drive shaft 18 and the bearing bracket 24 along the rails 14—14 until the combined bearing bracket 24-shaft bearing 26 is in proximity to the flexible coupling 20. At least one drive spindle 30 of at least one conveyor means 22 is subsequently slid along the drive shaft 18 (i.e. by passing the drive shaft 18 through the bore 50) until the conveyor means 22 extends over a predetermined area of the given frame base 12. Another combined bearing bracket 24-shaft bearing 26 is mounted by again simultaneously sliding the other shaft bearing 26 along the drive shaft 18 and the other bearing bracket 24 along the rails 14—14. The second combined bearing bracket 24-shaft bearing 26 is preferably mounted at a very short distance from the end of the drive shaft 18 to allow for lateral movement of any conveyor means 22 along the drive shaft 18. As the results of work from above the conveyor means 22 falls on endless conveyor belt 40, the results are carried away by the belt 40. Electronic control means 28 protects the conveyor means 22 and motor-gear box 16 from jam damage by, in the event of a jam, disconnecting power to the motor-gear box 16 and indicating a malfunction. Thus, by operation of this invention, there is provided a gang conveyor drive mount 10 which is adaptable for mounting to any given size base frame 12.

The invention provides total flexibility in locating conveyors 22 and accessories in various use positions without permanently fastening them to the frame base 12 which in a punch press or the like is usually permanently positioned. It is the tooling that is used within the press to produce product and scrap from work which is changed to suit the work. The mounting system of the invention provides a secure, temporary mounting for the desired conveyor means 22 and accessories desired for the particular tooling and work, and upon change in tooling and work desired therefor conveyor means 22 and accessories can be easily mounted and positioned. Thus, through practice of the invention all conveyor means 22 and accessories can be used on any frame base 12 on which the mounting system of the invention is installed, and if desired the mounting system can be removed from a particular frame base 12 to another.

The results of work can subsequently be removed from any size frame base 12.

While the present invention has been described herein with reference to particular embodiments thereof, a latitude of modification, various changes and substitutions are intended in the foregoing disclosure and it will be appreciated that in some instances some features of the invention will be employed without a corresponding use of other features without departing from the scope of the invention as set forth.

I claim:

1. A gang conveyor drive mount means mountable on a frame base comprising in combination;
    a pair of rail means generally securable superimposedly spacedly with respect to each other to the frame base;
    a motor-gear box means attached to said pair of rail means;
    a drive shaft means drove by and engaged to said motor-gear box means;
    at least one conveyor means slidably mounted along said drive shaft means and the upper one of said pair of rail means and extending when mounted over said frame base such that the results of work falls on said conveyor means in order to be transported to a storage or use area;
    at least one bracket means slidably mounted along said pair of rail means;
    at least one bearing means fixed to said bracket means and slidably mounted along said drive shaft means;
    said conveyor means and combined bracket-bearing means adapted in operation of the invention to be slidably adjusted along the drive shaft means and said pair of rail means in order that the gang conveyor drive mount means can be mounted on any given frame base.

2. The gang conveyor drive of claim 1 wherein said conveyor means comprises a drive spindle means slidably mounted along said drive shaft means.

3. The gang conveyor drive of claim 2 wherein said conveyor means additionally comprises a conveyor housing, said drive spindle means rotatably with said drive shaft means at one end of said conveyor housing; a tail roller rotatably disposed at the other end of said conveyor housing;

an idler roller and take-up roller rotatably positioned in said conveyor housing in proximity to said drive spindle means;

an endless belt engaging said drive spindle means, said tail roller, said idler roller and said take-up roller to form a loop;

and take-up means connected to said conveyor housing to said take-up roller to adjust said take-up roller in order to tighten or loosen said endless belt.

4. The gang conveyor drive of claim 3 comprising a pair of bearing brackets slidably mounted along said pair of rail means, each bearing bracket having a shaft bearing fixed thereto with said drive shaft means slidably positioned through said pair of shaft bearing and said drive spindle means of said conveyor means being disposed along said drive shaft means between said pair of shaft bearings.

5. The gang conveyor drive of claim 4 wherein said drive spindle means comprises a pair of mating generally circular flanged pieces, said flanged mated pieces having a combined structure defining a pair of opposed external recesses and a drive shaft bore wherethrough said drive shaft means passes to offer rotational power to the flanged mated pieces;

a spindle sleeve circumscribing the pair of mated flanged pieces and secured to each piece to hold the pieces together and to provide a surface for the endless belt to engage the same to be turned by the combined spindle sleeve-mated pieces which receive rotational power from the drive shaft means.

6. The gang conveyor drive of claim 5 additionally comprising a belt wiper means attached to said conveyor housing underneath said drive spindle means to wipe and clean said endless belt.

7. The gang conveyor drive of claim 6 additionally comprising a means for turning said conveyor means and said motor-gear box means on and off and electrically engaged to each.

8. The gang conveyor of claim 7 wherein said drive shaft means has a vertical cross section defining a square, said drive shaft bore having a generally square opening to mate with drive shaft means to effectively receive rotational power from the drive shaft means.

9. A method for transporting the result of work, or the like, from any given size frame base having a pair of rail means secured superimposedly thereto to a storage or use area, said method comprising the steps of:
  (a) engaging a drive shaft means to a motor-gear box means;
  (b) securing the motor-gear box means to the pair of rail means;
  (c) sliding along said drive shaft and the upper one of said pair of rail means at least one conveyor-means until the same extends over a predetermined area of said given size frame base such that the results of work from above fall on said conveyor means; and
  (d) fixing at least one bearing means to a bracket, and simultaneously slidably mounting the bracket to said pair of rail means and the bearing means along the drive shaft means.

* * * * *